(12) United States Patent
Venugopal et al.

(10) Patent No.: US 11,330,446 B2
(45) Date of Patent: May 10, 2022

(54) DYNAMICALLY ENABLING DUAL DEFAULT BEAMS

(71) Applicant: QUALCOMM Incorporated, San Diego, CA (US)

(72) Inventors: Kiran Venugopal, Raritan, NJ (US); Yan Zhou, San Diego, CA (US); Sony Akkarakaran, Poway, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/114,289

(22) Filed: Dec. 7, 2020

(65) Prior Publication Data

US 2021/0235284 A1 Jul. 29, 2021

Related U.S. Application Data

(60) Provisional application No. 62/967,532, filed on Jan. 29, 2020.

(51) Int. Cl.
*H04W 16/28* (2009.01)
*H04W 52/02* (2009.01)
*H04B 7/024* (2017.01)
*H04W 76/28* (2018.01)

(52) U.S. Cl.
CPC ............ *H04W 16/28* (2013.01); *H04B 7/024* (2013.01); *H04W 52/0261* (2013.01); *H04W 76/28* (2018.02)

(58) Field of Classification Search
CPC . H04W 16/28; H04W 52/0261; H04W 76/28; H04B 7/024; H04B 7/022; H04B 7/0408; Y02D 30/70
See application file for complete search history.

(56) References Cited

U.S. PATENT DOCUMENTS

| | | | |
|---|---|---|---|
| 2018/0219605 A1* | 8/2018 | Davydov | H04B 7/088 |
| 2019/0141691 A1* | 5/2019 | Kwon | H04W 72/046 |
| 2019/0182821 A1* | 6/2019 | You | H04B 7/0408 |
| 2019/0239212 A1* | 8/2019 | Wang | H04L 5/0091 |
| 2020/0008231 A1* | 1/2020 | Vilaipornsawai | H04W 72/1273 |
| 2020/0045745 A1* | 2/2020 | Cirik | H04W 76/27 |
| 2020/0107235 A1* | 4/2020 | Peisa | H04W 74/02 |
| 2020/0154467 A1* | 5/2020 | Gong | H04W 24/08 |
| 2020/0213978 A1* | 7/2020 | Iyer | H04L 1/1812 |
| 2021/0084669 A1* | 3/2021 | Mondal | H04W 72/042 |
| 2021/0136802 A1* | 5/2021 | Cirik | H04W 72/1278 |
| 2021/0143936 A1* | 5/2021 | Zhang | H04L 5/0023 |
| 2021/0144808 A1* | 5/2021 | Zhang | H04W 52/0274 |

\* cited by examiner

Primary Examiner — Kenneth T Lam
(74) Attorney, Agent, or Firm — Qualcomm Incorporated

(57) ABSTRACT

Aspects of the present disclosure provide apparatus, methods, processing systems, and computer readable mediums for processing transmissions with multiple beams. For example, the techniques may be implemented in wireless systems in which any type of network entity (gNB or transmission reception points TRPs) send directional transmissions to user equipments (UEs) that receive the directional transmissions with receive beams.

26 Claims, 9 Drawing Sheets

DYNAMICALLY ENABLING DUAL DEFAULT BEAMS

CROSS-REFERENCE TO RELATED APPLICATION

This application claims benefit of and priority to U.S. Provisional patent Application Ser. No. 62/967,532, filed on Jan. 29, 2020, herein incorporated by reference in its entirety as if fully set forth below and for all applicable purposes.

FIELD OF THE DISCLOSURE

Aspects of the present disclosure relate to wireless communications, and more particularly, to techniques for processing transmissions with default beams.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes receiving dynamic signaling from a network entity of an indication that a mode, in which multiple default beams are used for physical downlink shared channel (PDSCH) transmission from multiple transmit receive points (TRPs), is enabled or disabled, and processing PDSCH transmissions from the multiple TRPs with one or more default beams in accordance with the indication.

Certain aspects provide a method for wireless communication by a network entity. The method generally includes dynamically signaling a UE an indication that a mode, in which multiple default beams are used for physical downlink shared channel (PDSCH) transmission from multiple transmit receive points (TRPs), is enabled or disabled, and scheduling PDSCH transmissions from the multiple TRPs with one or more default beams in accordance with the indication.

Certain aspects provide means for, apparatus, and/or computer readable medium having computer executable code stored thereon, for techniques described herein for processing multi-TRP transmissions.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
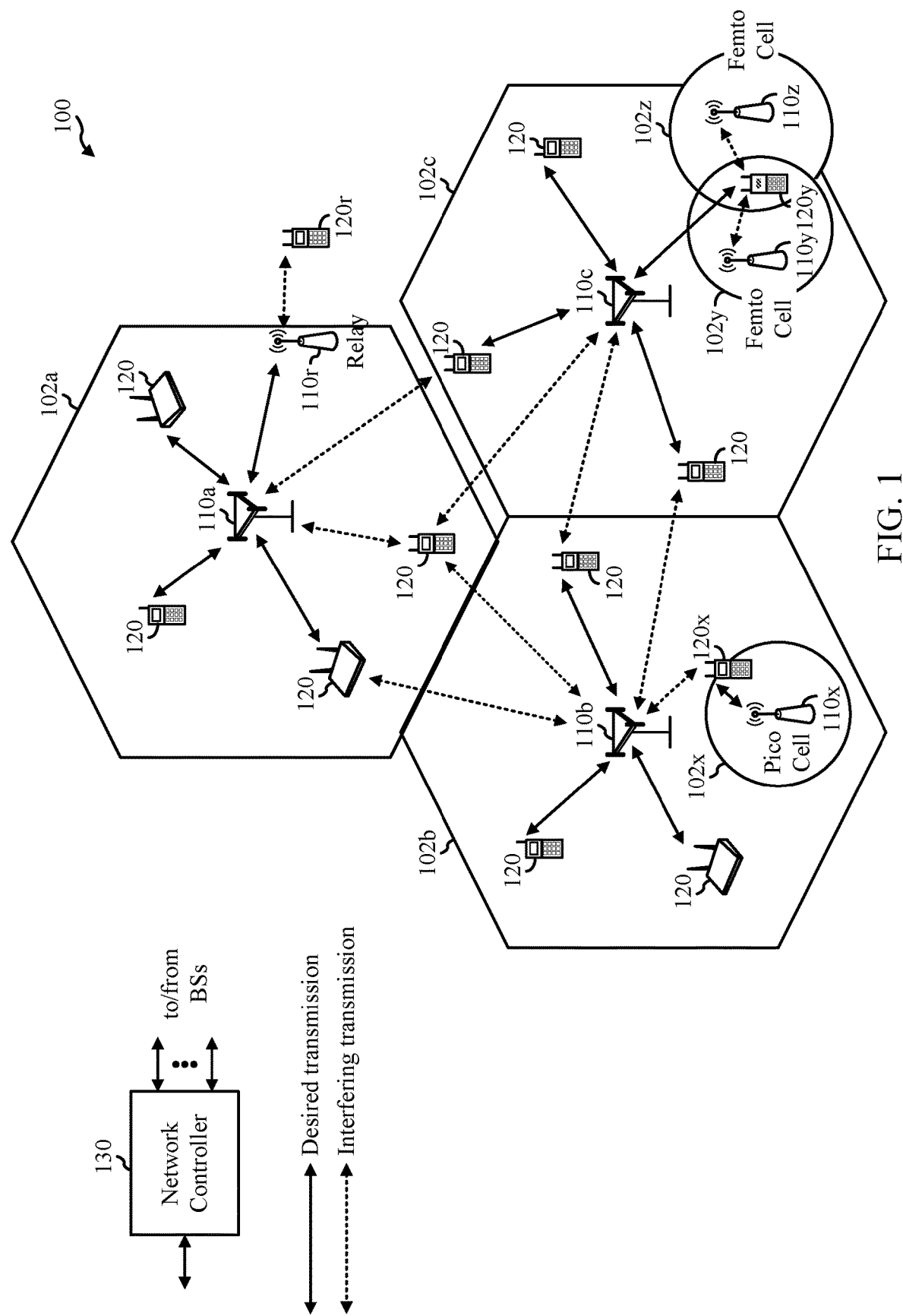
FIG. 1 is a block diagram conceptually illustrating an example telecommunications system, in accordance with certain aspects of the present disclosure.

Aspects of the present disclosure provide apparatus, methods, processing systems, and computer readable mediums for processing transmissions with multiple beams. For example, the techniques may be implemented in wireless systems in which any type of network entity (gNB or transmission reception points TRPs) send directional transmissions to user equipments (UEs) that receive the directional transmissions with receive beams.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (SGTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, BSs 110 may perform operations 900 of FIG. 9 as part of a multiple transmission reception point (multi-TRP) session with a UE 120. In some cases, perform operations 800 of FIG. 8 to process PDSCH transmissions received during the session.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
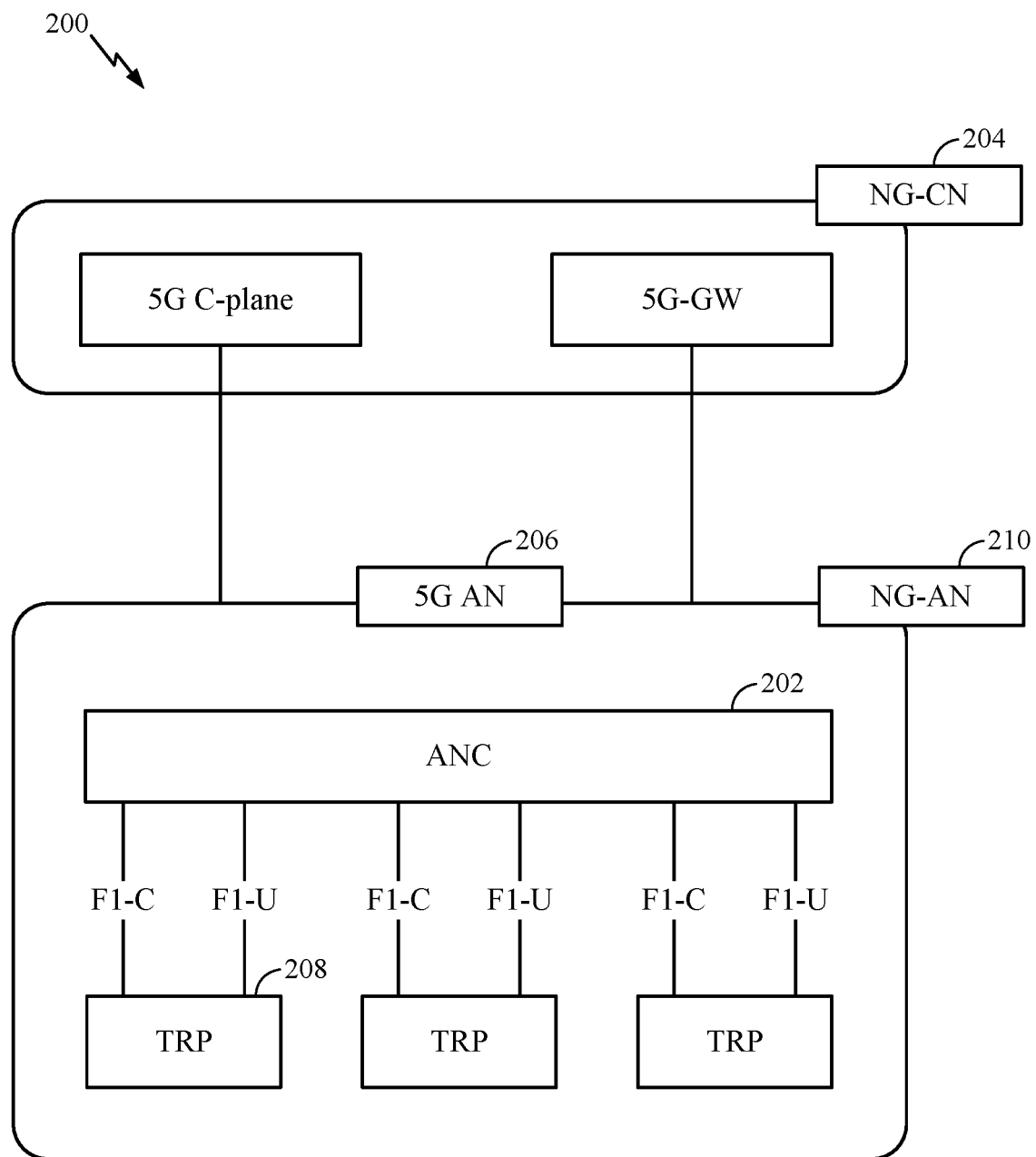
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
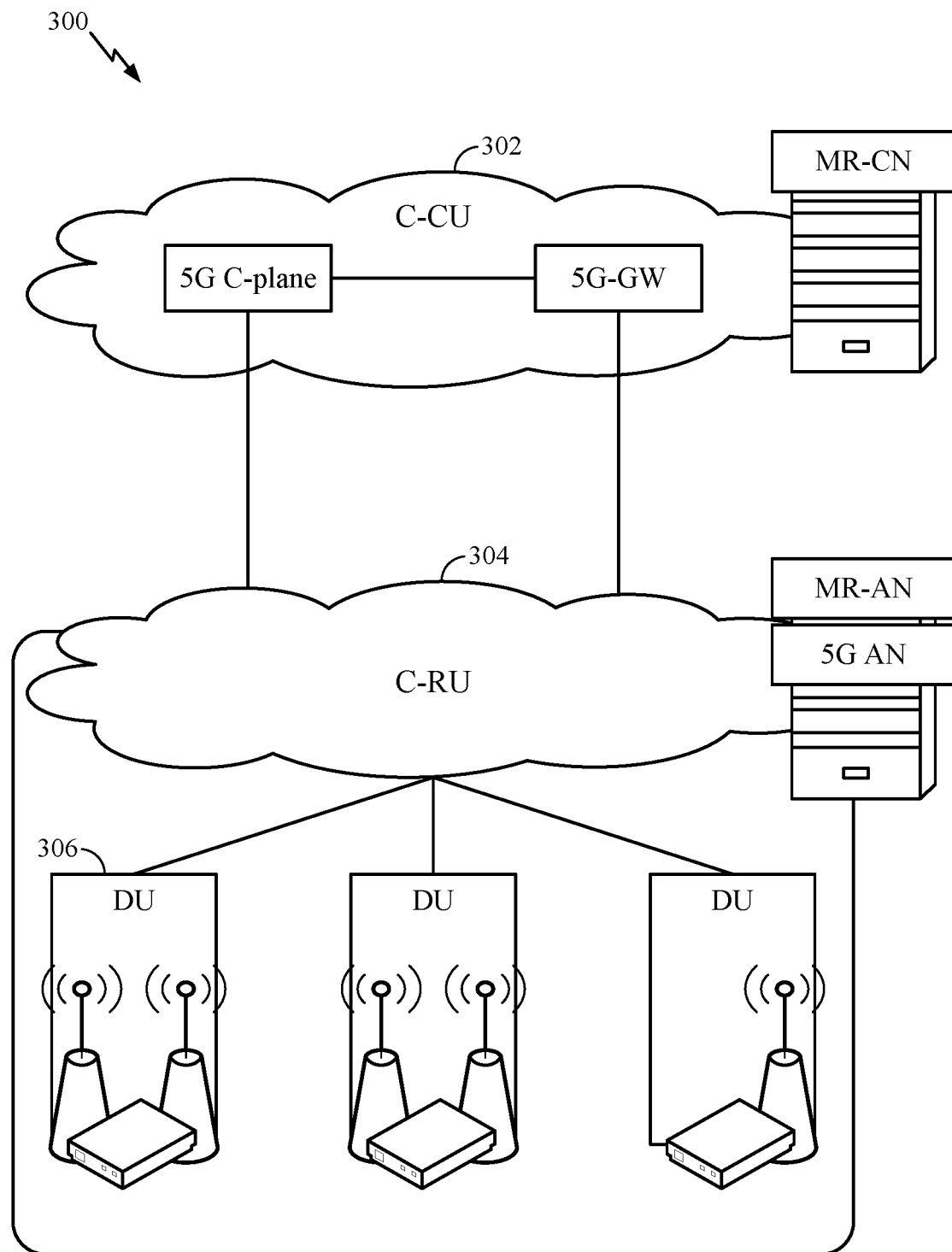
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
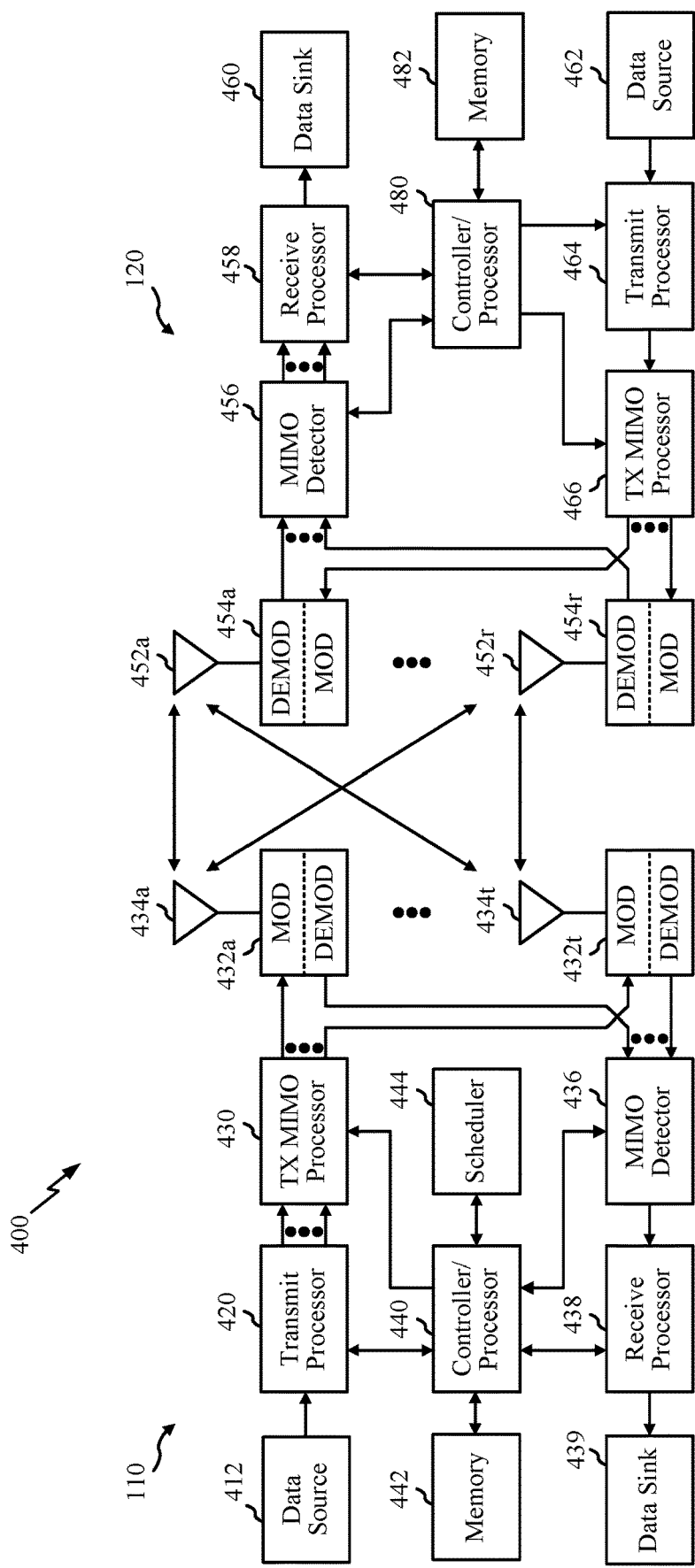
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 may perform (or be used to perform) operations 800 of FIG. 8. Similarly, antennas 434, processors 420, 430, 438, and/or controller/processor 440 of the BS 110 may perform (or be used to perform) operations 900 of FIG. 9.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 5:
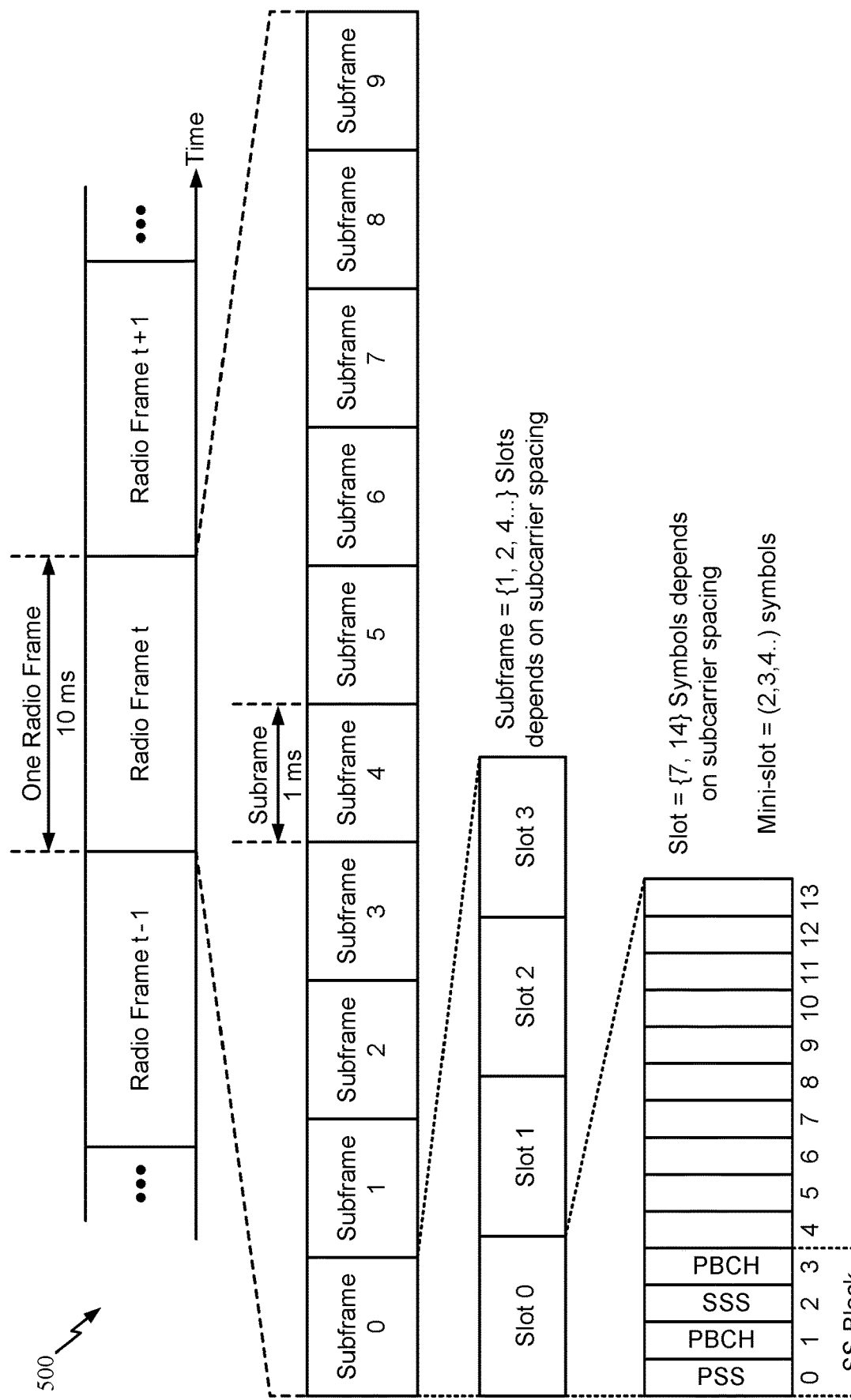
FIG. 5 is a diagram showing examples for implementing a communication protocol stack, in accordance with certain aspects of the present disclosure.

FIG. 5 is a diagram showing an example of a frame format 500 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 5. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Multi-TRP Scenarios

Figure 6:
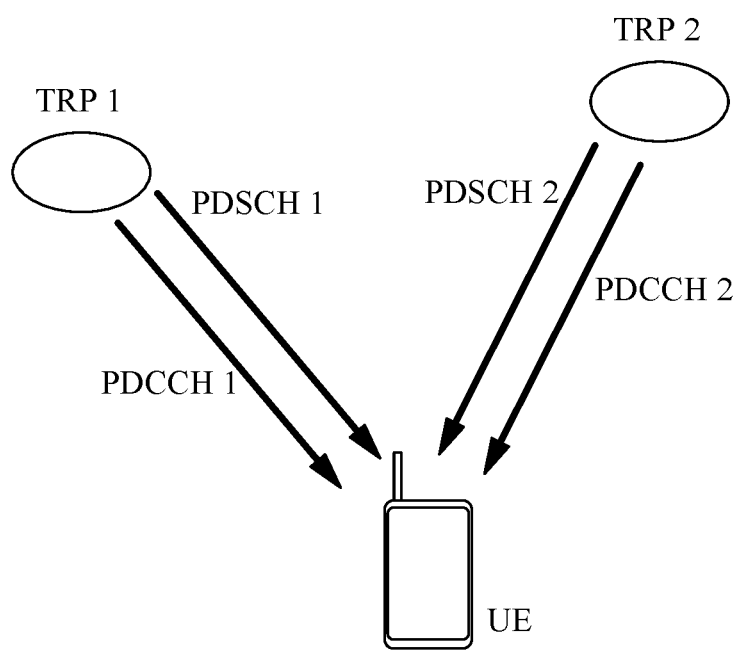
FIG. 6 illustrates a diagram illustrating an example multiple transmission reception point (TRP) transmission scenario, in accordance with certain aspects of the present disclosure.

NR networks are expected to utilize multiple transmission and reception points (TRPs) to improve reliability and capacity performance through flexible deployment scenarios. For example, allowing UEs to access wireless networks via multi-TRPs may help support increased mobile data traffic and enhance the coverage. Multi-TRPs may be used to implement one or more macro-cells, small cells, pico-cells, or femto-cells, and may include remote radio heads, relay nodes, and the like. FIG. 6 illustrates an example multi-TRP scenario, in which two TRPs (TRP 1 and TRP 2) serve a UE.

As illustrated in FIG. 6, for multi-TRP transmission, multiple PDCCHs (each transmitted from a different one of the multiple TRPs) may be used for scheduling. Each PDCCH may include corresponding downlink control information (DCI).

For example, PDCCH1 (transmitted from TRP 1) may carry a first DCI that schedules a first codeword (CW1) to be transmitted from TRP1 in PDSCH1. Similarly, PDCCH2 (transmitted from TRP2) may carry a second DCI that schedules a second codeword (CW2) to be transmitted from TRP2 in PDSCH2.

For monitoring the DCIs transmitted from different TRPs, a number of different control resource sets (CORESETs) may be used. As used herein, the term CORESET generally refers to a set of physical resources (e.g., a specific area on the NR Downlink Resource Grid) and a set of parameters that is used to carry PDCCH/DCI. For example, a CORESET may by similar in area to an LTE PDCCH area (e.g., the first 1, 2, 3, 4 OFDM symbols in a subframe).

In some cases, TRP differentiation at the UE side may be based on CORESET groups. CORESET groups may be defined by higher layer signaling of an index per CORESET which can be used to group the CORESETs. For example, for 2 CORESET groups, two indexes may be used (i.e. index=0 and index=1). Thus, a UE may monitor for transmissions in different CORESET groups and infer that transmissions sent in different CORESET groups come from different TRPs. There may be other ways in which the notion of different TRPs may be transparent to the UE.

Examples for Dynamically Enabling Dual Default Beams in mTRP

Wireless systems, such as NR, support beam indication where a base station (e.g., gNB) informs a UE that a certain transmission (e.g., PDSCH and/or PDCCH) will use a same transmission beam as a configured reference signal (CSI-RS or SS block). This implies that the gNB is transmitted using the same spatial filter as the configured reference signal.

Such beam indication is conveyed via the configuration and downlink signaling of Transmission Configuration Indication (TCI) states. Each TCI state includes information about a reference signal (CSI-RS or SSB). By associating a certain downlink transmission (PDCCH or PDSCH) with a certain TCI, the network informs the UE that it can assume that the downlink transmission is done using the same spatial filter (transmit beam) as the reference signal associated with that TCI.

Figure 7:
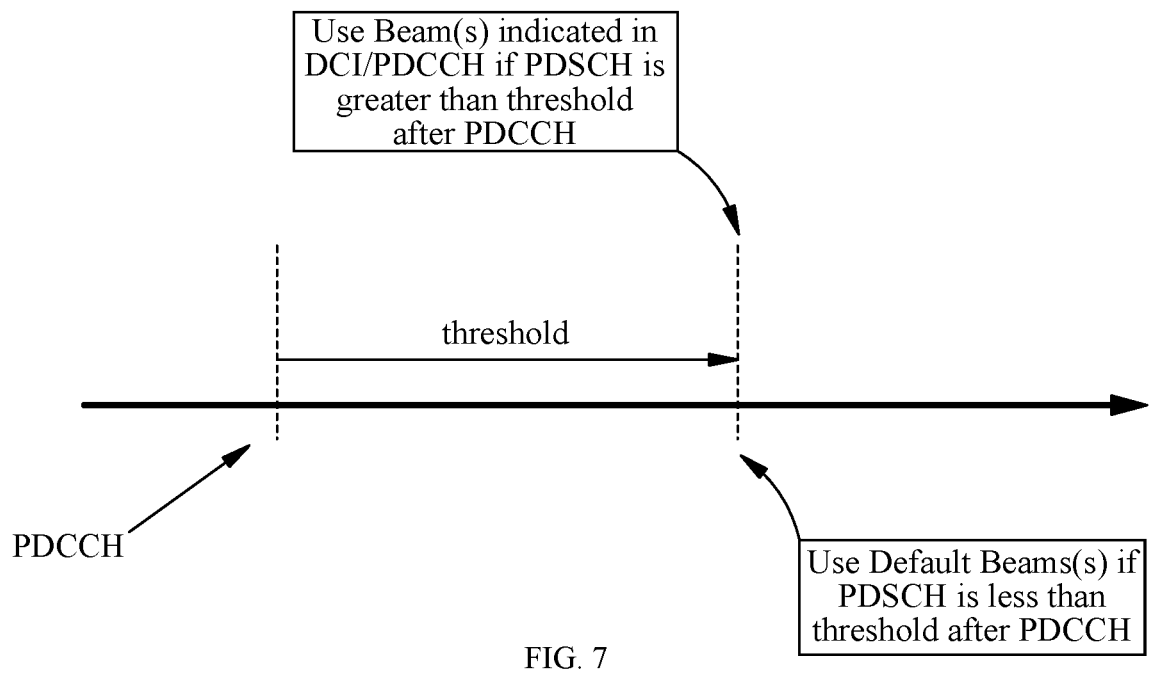
FIG. 7 is a block diagram illustrating example PDSCH scheduling and default beam usage, in accordance with certain aspects of the present disclosure.

As illustrated in FIG. 7, for PDSCH beam indication, there are two alternatives depending on the scheduling offset, which generally refers to the time between the scheduling PDCCH and the scheduled PDSCH.

As illustrated, if this scheduling offset is larger than a threshold value (e.g., N symbols), the DCI of the scheduling assignment may explicitly indicate the TCI state for the PDSCH transmission. The UE is first configured with a set of up to eight TCI states (from the originally configured set of candidate TCI states). A three-bit indicator within the DCI then indicates the exact TCI state valid for the scheduled PDSCH transmission.

On the other hand, if the scheduling offset is less than the threshold, the UE can assume a default beam. For example, the UE may assume that the PDSCH transmission is quasi co-located (QCL'd) with the corresponding PDCCH transmission.

In some cases (e.g., per Release 16), a UE may support a first feature where simultaneous dual default PDSCH beams may be used in multi-TRP scenarios. How such default beams are determined may vary. For example, in a multi-DCI based mTRP scenario (as shown in FIG. 6), each default beam may be determined by a QCL Type-D RS of the lowest CORESET ID among CORESETs with a same pool index in the latest monitored slot having those CORESETs. In such cases, the UE may assume that the DM-RS ports of the PDSCH transmission are QCL-ed with the RS(s) with respect to the QCL parameter(s) used for the PDCCH of the lowest CORESET index among CORESETs configured with the same value of CORESETPoolIndex. If a UE does not support this feature (as indicated by UE capability), other default beam behavior (e.g., per Release 15) may be reused regardless of the CORESETPoolIndex.

A UE may also support a second feature, in a single-DCI based mTRP scenario, where the two default beams are determined by the 2 active TCI states mapped to the lowest TCI codepoint ID (among TCI codepoints containing 2 TCI states). Supporting both the first and second features described herein may be indicated by separate UE capabilities. However, a UE may sometimes prefer to disable one or both such features (with dual default beams) for power saving, for example, by making one Rx panel in sleep mode.

Aspects of the present disclosure provide techniques that may allow a UE to request (and/or be configured) to enable or disable a mode in which multiple default beams are used for PDSCH transmissions from multiple TRPs. In some cases, the UE may receive dynamic signaling (e.g., physical layer signaling, such as DCI or MAC layer signaling) from a network entity of an indication that a mode, in which multiple default beams are used for physical downlink shared channel (PDSCH) transmission from multiple transmit receive points (TRPs), is enabled or disabled. The UE may then process PDSCH transmissions from the multiple TRPs with one or more default beams in accordance with the indication.

Figure 8:
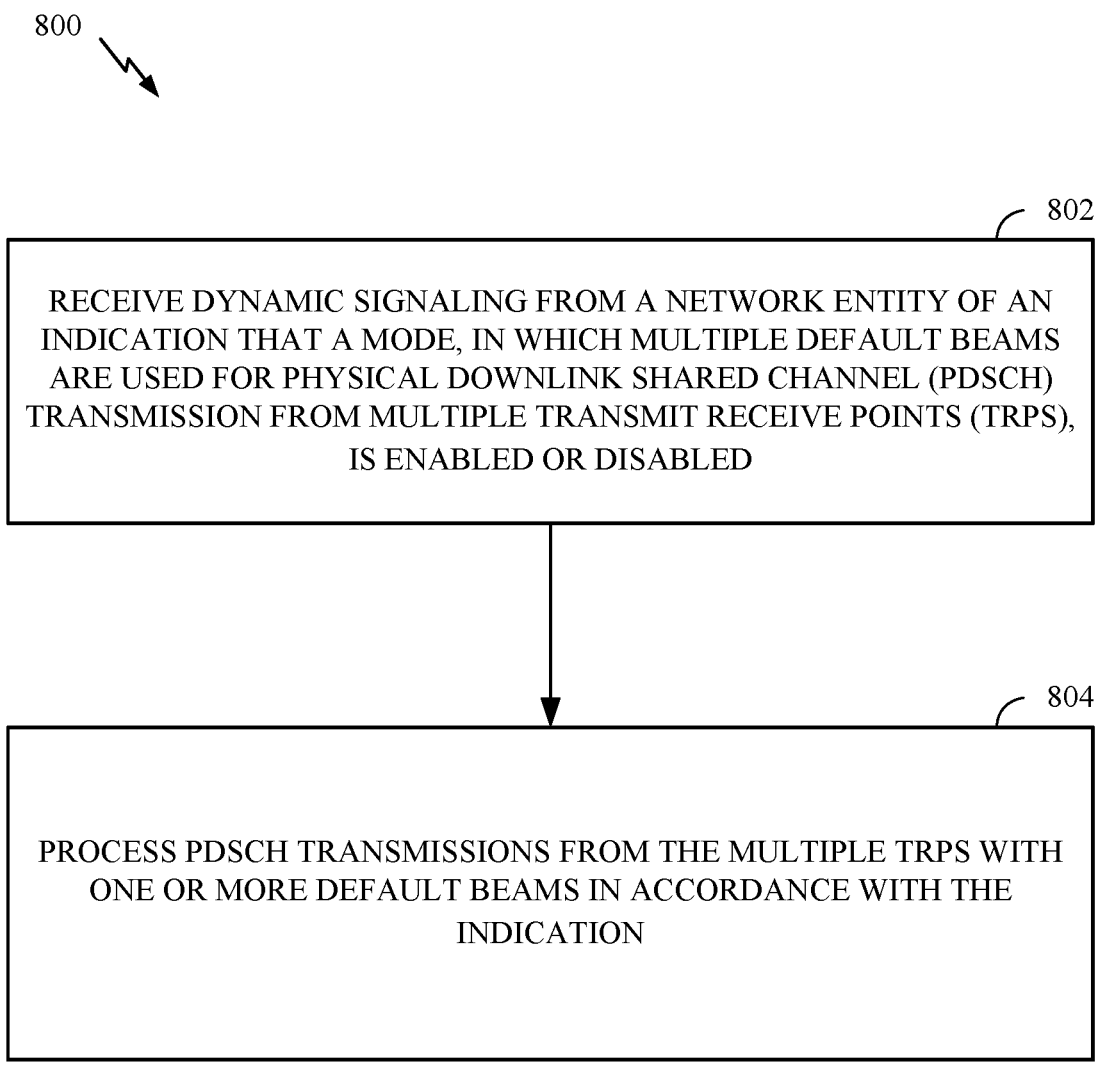
FIG. 8 is a flow diagram illustrating example operations that may be performed by a UE, in accordance with certain aspects of the present disclosure.

FIG. 8 is a flow diagram illustrating example operations 800 for wireless communications, in accordance with certain aspects of the present disclosure. The operations 800 may be performed, for example, by a UE (e.g., such as a UE 120 in the wireless communication network 100).

The operations 800 begin, at 802, by receiving dynamic signaling from a network entity of an indication that a mode, in which multiple default beams are used for physical downlink shared channel (PDSCH) transmission from multiple transmit receive points (TRPs), is enabled or disabled.

At 804, the UE processes PDSCH transmissions from the multiple TRPs with one or more default beams in accordance with the indication.

Figure 9:
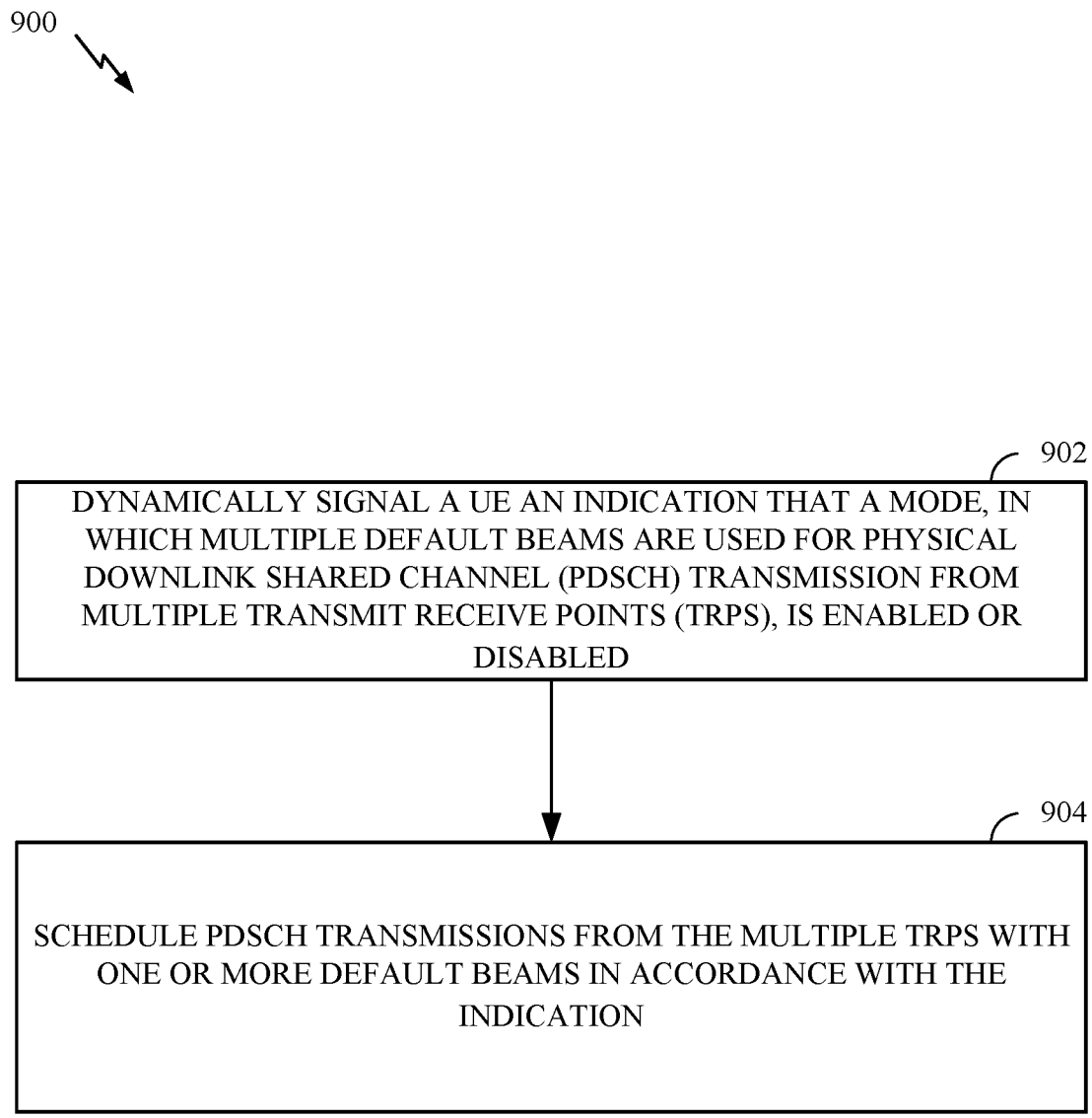
FIG. 9 is a flow diagram illustrating example operations that may be performed by a network entity, in accordance with certain aspects of the present disclosure.

FIG. 9 is a flow diagram illustrating example operations 900 for wireless communications, in accordance with certain aspects of the present disclosure. The operations 1200 may be performed, for example, by a network entity (e.g., such as a BS 110 in the wireless communication network 100) or TRP(s).

The operations 900 begin, at 902, by dynamically signaling a UE an indication that a mode, in which multiple default beams are used for physical downlink shared channel (PDSCH) transmission from multiple transmit receive points (TRPs), is enabled or disabled.

At 904, the network entity schedules PDSCH transmissions from the multiple TRPs with one or more default beams in accordance with the indication.

In some cases, the UE may request to enable/disable the dual default PDSCH beams. In such cases, the request can be sent via radio resource control (RRC) and/or medium access control (MAC) control element (CE) signaling. The request may also be provided via the same or separate requests to enable/disable the dual default beam features described above. In some cases, only UEs that support a corresponding feature can send such a request.

In some cases, after receiving a request, the gNB will indicate to the UE the final decision. For example, the gNB may send a response via an enable/disable flag, carried via RRC, MAC-CE, or DCI signaling. If disabled, the UE will use a single default beam (e.g., the UE may fall-back to Release 15 behaviour).

In some cases, the gNB can configure one or more conditions that determine when the UE can send the enable/disable request. For example, the UE may be configured to send a request (to disable dual default beams) if battery life is below a threshold value (e.g., <X hours or <X %). Otherwise, the UE may send a request to enable a mode with dual default beams. In some cases, a UE can also report such power saving related metrics together with a request (e.g., battery life as a time remaining or percentage).

In some cases, a gNB can indicate whether single or dual default beams are enabled in a wakeup signal (WUS) used to indicate a UE in a discontinuous reception (DRX) mode is to wake up for a DRX ON period. The indication may be applied to the single DRX ON period or multiple (all) DRX ON periods following the WUS carrying the indication.

In some cases, the gNB may configure multiple bandwidth parts (BWPs), which may have different default beams. For example, if the UE has an active BWP on BWP1, the UE may be configured to use a single default beam. If the UE has an active BWP on BWP2, the UE may be configured to use multiple (dual) default beams.

In such cases, switching to which BWP can be indicated by the gNB, for example, based on a UE default beam request to enable/disable dual default beams (as described above).

In New Radio (NR) deployments, a new UE behavior is defined for an activated Scell, called the Scell dormancy-like behavior. When an activated Scell is configured for dormancy-like behavior, UE activity is reduced on the Scell (e.g., for power saving). For example, when an SCell is configured with dormancy-like behavior, the UE may:

Not perform PDCCH monitoring;
Not PDSCH reception; and/or
Reduce CSI/measurement and/or reporting frequency.

The network can switch an Scell between non-dormancy-like behavior and dormancy-like behavior. When the Scell is configured for non-dormancy-like behavior, the UE has full utilization of the Scell as usual. When multiple SCells are configured to a UE, the dormancy indication can be applied to individual SCells or Scell groups.

In some cases, a BWP configured as a dormancy BWP in SCell dormancy may be configured to have a single default beam, while other non-dormancy BWPs may have or be configured to have dual default beams. In such cases, switching to dormancy BWP can be indicated by the gNB as in R16, (e.g., via DCI or WUS), which may also effectively signal whether single or multiple default beams are to be used.

Example Aspects

Aspect 1: A method for wireless communications by a user equipment (UE), comprising: receiving dynamic signaling from a network entity of an indication that a mode, in which multiple default beams are used for physical downlink shared channel (PDSCH) transmission from multiple transmit receive points (TRPs), is enabled or disabled; and processing PDSCH transmissions from the multiple TRPs with one or more default beams in accordance with the indication.

Aspect 2: The method of Aspect 1, wherein the dynamic signaling comprises at least one of: a downlink control information (DCI), a medium access control (MAC) control element (MAC CE), or radio resource control (RRC) signaling.

Aspect 3: The method of any one of Aspects 1-2, wherein PDSCH transmission are processed using a single default beam if the indication is that the mode, in which multiple default beams are used for physical downlink shared channel (PDSCH) transmission from multiple transmit receive points (TRPs), is disabled.

Aspect 4: The method of any one of Aspects 1-3, wherein, when the mode is enabled and PDSCH transmissions from the multiple TRPs are scheduled with multiple downlink control informations (DCIs): each default beam is determined based on a spatially co-located reference signal (RS) of a certain command resource set (CORESET) ID among CORESETs with a common pool index.

Aspect 5: The method of any one of Aspects 1-4, wherein, when the mode is enabled and PDSCH transmissions from the multiple TRPs are scheduled with a single downlink control information (DCI): the default beams are determined based on active transmission configuration indicator (TCI) states mapped to certain TCI codepoint ID among TCI codepoints containing multiple TCI states.

Aspect 6: The method of any one of Aspects 1-5, further comprising: sending, to the network entity, a request to enable or disable the mode prior to receiving the indication.

Aspect 7: The method of Aspect 6, wherein the request is sent via at least one of: a medium access control (MAC) control element (MAC CE) or radio resource control (RRC) signaling.

Aspect 8: The method of Aspect 6, wherein the request is sent with a request for a feature that involves multiple default beams for PDSCH transmissions from the multiple TRPs scheduled via single or multiple DCIs.

Aspect 9: The method of Aspect 6, further comprising: receiving a configuration indicating when the UE is to send the request based on at least one condition; and sending the request if the at least one condition is met.

Aspect 10: The method of Aspect 9, wherein: the at least one condition relates to battery life of the UE; and the configuration indicates the UE is to send a request to disable the mode if the battery life is below a threshold value.

Aspect 11: The method of Aspect 6, wherein the UE provides a power saving related metric with the request for the network entity to consider with the request.

Aspect 12: The method of any one of Aspects 1-11, wherein the dynamic signaling comprises a wake up signal (WUS) received while the UE is in a discontinuous reception (DRX) mode.

Aspect 13: The method of Aspect 12, wherein the indication is applied to one or more ON periods of the DRX mode after receiving the WUS.

Aspect 14: The method of any one of Aspects 1-13, wherein: the UE is configured with at least first and second bandwidth parts (BWPs) having different default beams.

Aspect 15: The method of Aspect 14, wherein: the UE uses a single default PDSCH beam when the first BWP is active; the UE uses multiple default PDSCH beams when the second BWP is active; and the indication is received via a BWP switch between the first and second BWPs.

Aspect 16: The method of Aspect 14, wherein: the UE is configured to use a single default PDSCH beam when the first BWP is configured as a dormant BWP; the UE is configured to use multiple default PDSCH beams when the second BWP is configured as a non-dormant BWP; and the indication is received via a switch of at least one of the first or second BWPs to or from a dormant or non-dormant BWP.

Aspect 17: A method for wireless communications by a network entity, comprising: dynamically signaling a UE an indication that a mode, in which multiple default beams are used for physical downlink shared channel (PDSCH) transmission from multiple transmit receive points (TRPs), is enabled or disabled; and scheduling PDSCH transmissions from the multiple TRPs with one or more default beams in accordance with the indication.

Aspect 18: The method of Aspect 17, wherein the dynamic signaling comprises at least one of: a downlink control information (DCI), a medium access control (MAC) control element (MAC CE), or radio resource control (RRC) signaling.

Aspect 19: The method of any of Aspects 17-18, wherein PDSCH transmission are processed using a single default beam if the indication is the mode is disabled.

Aspect 20: The method of any of Aspects 17-19, wherein, when the mode is enabled and PDSCH transmissions from the multiple TRPs are scheduled with multiple downlink control informations (DCIs): each default beam is determined based on a spatially co-located reference signal (RS) of a certain command resource set (CORESET) ID among CORESETs with a common pool index.

Aspect 21: The method of any of Aspects 17-20, wherein, when the mode is enabled and PDSCH transmissions from the multiple TRPs are scheduled with a single downlink control information (DCI): the default beams are determined based on active transmission configuration indicator (TCI) states mapped to certain TCI codepoint ID among TCI codepoints containing multiple TCI states.

Aspect 22: The method of any of Aspects 17-21, further comprising: receiving, from the UE, a request to enable or disable the mode prior to receiving the indication.

Aspect 23: The method of Aspect 22, wherein the request is received via at least one of: a medium access control (MAC) control element (MAC CE) or radio resource control (RRC) signaling.

Aspect 24: The method of Aspect 22, wherein the request is received with a request for a feature that involves multiple default beams for PDSCH transmissions from the multiple TRPs scheduled via single or multiple DCIs.

Aspect 25: The method of Aspect 22, further comprising: sending the UE a configuration indicating when the UE is to send the request based on at least one condition.

Aspect 26: The method of Aspect 25, wherein: the at least one condition relates to battery life of the UE; and the configuration indicates the UE is to send a request to disable the mode if the battery life is below a threshold value.

Aspect 27: The method of Aspect 22, wherein the UE provides a power saving related metric with the request for the network entity to consider with the request.

Aspect 28: The method of any of Aspects 17-28, wherein the dynamic signaling comprises a wake up signal (WUS) received while the UE is in a discontinuous reception (DRX) mode.

Aspect 29: An apparatus for wireless communications by a user equipment (UE), comprising: a receiver configured to receive dynamic signaling of an indication from a network entity that a mode, in which multiple default beams are used for physical downlink shared channel (PDSCH) transmission from multiple transmit receive points (TRPs), is enabled or disabled; and at least one processor configured to process PDSCH transmissions from the multiple TRPs with one or more default beams in accordance with the indication.

Aspect 30: An apparatus for wireless communications by a network entity, comprising: a transmitter configured to dynamically signal a UE an indication that a mode, in which multiple default beams are used for physical downlink shared channel (PDSCH) transmission from multiple transmit receive points (TRPs), is enabled or disabled; and at least one processor configured to schedule PDSCH transmissions from the multiple TRPs with one or more default beams in accordance with the indication. The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 8, and/or FIG. 9.

Further, it should be appreciated that modules and/or other appropriate means for performing the methods and techniques described herein can be downloaded and/or otherwise obtained by a user equipment and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user equipment and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
receiving a configuration indicating when the UE is to send a request to a network entity, to enable or disable a mode in which multiple default beams are used for physical downlink shared channel (PDSCH) transmission from multiple transmit receive points (TRPs), based on at least one condition;
sending the request if the at least one condition is met;
after sending the request, receiving dynamic signaling from the network entity of an indication that the mode is enabled or disabled; and
processing PDSCH transmissions from the multiple TRPs with one or more default beams in accordance with the indication.

2. The method of claim 1, wherein the dynamic signaling comprises at least one of:
a downlink control information (DCI), a medium access control (MAC) control element (MAC CE), or radio resource control (RRC) signaling.

3. The method of claim 1, wherein PDSCH transmission are processed using a single default beam if the indication is that the mode, in which multiple default beams are used for PDSCH transmission from multiple TRPs, is disabled.

4. The method of claim 1, wherein, when the mode is enabled and PDSCH transmissions from the multiple TRPs are scheduled with multiple downlink control informations (DCIs):
each default beam is determined based on a spatially co-located reference signal (RS) of a certain command resource set (CORESET) ID among CORESETs with a common pool index.

5. The method of claim 1, wherein, when the mode is enabled and PDSCH transmissions from the multiple TRPs are scheduled with a single downlink control information (DCI):
the default beams are determined based on active transmission configuration indicator (TCI) states mapped to certain TCI codepoint ID among TCI codepoints containing multiple TCI states.

6. The method of claim 1, wherein the request is sent via at least one of:
a medium access control (MAC) control element (MAC CE) or radio resource control (RRC) signaling.

7. The method of claim 1, wherein the request is sent with a request for a feature that involves multiple default beams for PDSCH transmissions from the multiple TRPs scheduled via single or multiple DCIs.

8. The method of claim 1, wherein:
the at least one condition relates to battery life of the UE; and
the configuration indicates the UE is to send a request to disable the mode if the battery life is below a threshold value.

9. The method of claim 1, wherein the UE provides a power saving related metric with the request for the network entity to consider with the request.

10. The method of claim 1, wherein the dynamic signaling comprises a wake up signal (WUS) received while the UE is in a discontinuous reception (DRX) mode.

11. The method of claim 10, wherein the indication is applied to one or more ON periods of the DRX mode after receiving the WUS.

12. The method of claim 1, wherein:
the UE is configured with at least first and second bandwidth parts (BWPs) having different default beams.

13. The method of claim 12, wherein:
the UE uses a single default PDSCH beam when the first BWP is active;
the UE uses multiple default PDSCH beams when the second BWP is active; and
the indication is received via a BWP switch between the first and second BWPs.

14. The method of claim 12, wherein:
the UE is configured to use a single default PDSCH beam when the first BWP is configured as a dormant BWP;
the UE is configured to use multiple default PDSCH beams when the second BWP is configured as a non-dormant BWP; and
the indication is received via a switch of at least one of the first or second BWPs to or from a dormant or non-dormant BWP.

15. A method for wireless communications by a network entity, comprising:
sending a user equipment (UE) a configuration indicating when the UE is to send a request, to enable or disable a mode in which multiple default beams are used for physical downlink shared channel (PDSCH) transmission from multiple transmit receive points (TRPs), based on at least one condition;
receiving, from the UE, the request to enable or disable the mode;
after receiving the request, dynamically signaling the UE an indication that the mode is enabled or disabled; and
scheduling PDSCH transmissions from the multiple TRPs with one or more default beams in accordance with the indication.

16. The method of claim 15, wherein the dynamic signaling comprises at least one of:

a downlink control information (DCI), a medium access control (MAC) control element (MAC CE), or radio resource control (RRC) signaling.

17. The method of claim 15, wherein PDSCH transmission are processed using a single default beam if the indication is the mode is disabled.

18. The method of claim 15, wherein, when the mode is enabled and PDSCH transmissions from the multiple TRPs are scheduled with multiple downlink control informations (DCIs):
each default beam is determined based on a spatially co-located reference signal (RS) of a certain command resource set (CORESET) ID among CORESETs with a common pool index.

19. The method of claim 15, wherein, when the mode is enabled and PDSCH transmissions from the multiple TRPs are scheduled with a single downlink control information (DCI):
the default beams are determined based on active transmission configuration indicator (TCI) states mapped to certain TCI codepoint ID among TCI codepoints containing multiple TCI states.

20. The method of claim 15, wherein the request is received via at least one of:
a medium access control (MAC) control element (MAC CE) or radio resource control (RRC) signaling.

21. The method of claim 15, wherein the request is received with a request for a feature that involves multiple default beams for PDSCH transmissions from the multiple TRPs scheduled via single or multiple DCIs.

22. The method of claim 15, wherein:
the at least one condition relates to battery life of the UE; and
the configuration indicates the UE is to send a request to disable the mode if the battery life is below a threshold value.

23. The method of claim 15, wherein the UE provides a power saving related metric with the request for the network entity to consider with the request.

24. The method of claim 15, wherein the dynamic signaling comprises a wake up signal (WUS) received while the UE is in a discontinuous reception (DRX) mode.

25. An apparatus for wireless communications by a user equipment (UE), comprising:
a transceiver configured to:
receive a configuration indicating when the UE is to send a request to a network entity, to enable or disable a mode in which multiple default beams are used for physical downlink shared channel (PDSCH) transmission from multiple transmit receive points (TRPs), based on at least one condition;
send the request if the at least one condition is met; and
after sending the request, receive dynamic signaling of an indication from the network entity that the mode is enabled or disabled; and
at least one processor configured to process PDSCH transmissions from the multiple TRPs with one or more default beams in accordance with the indication.

26. An apparatus for wireless communications by a network entity, comprising:
a transceiver configured to:
send a user equipment (UE) a configuration indicating when the UE is to send a request, to enable or disable a mode in which multiple default beams are used for physical downlink shared channel (PDSCH) transmission from multiple transmit receive points (TRPs), based on at least one condition;
receive, from the UE, the request to enable or disable the mode; and
after receiving the request, dynamically signal the UE an indication that the mode is enabled or disabled; and
at least one processor configured to schedule PDSCH transmissions from the multiple TRPs with one or more default beams in accordance with the indication.

* * * * *